Aug. 14, 1934.   P. H. BULLOCK   1,969,713
ELECTRICAL TEST SET
Filed April 1, 1932   2 Sheets-Sheet 1

Inventor
P. H. BULLOCK
By
Attorney

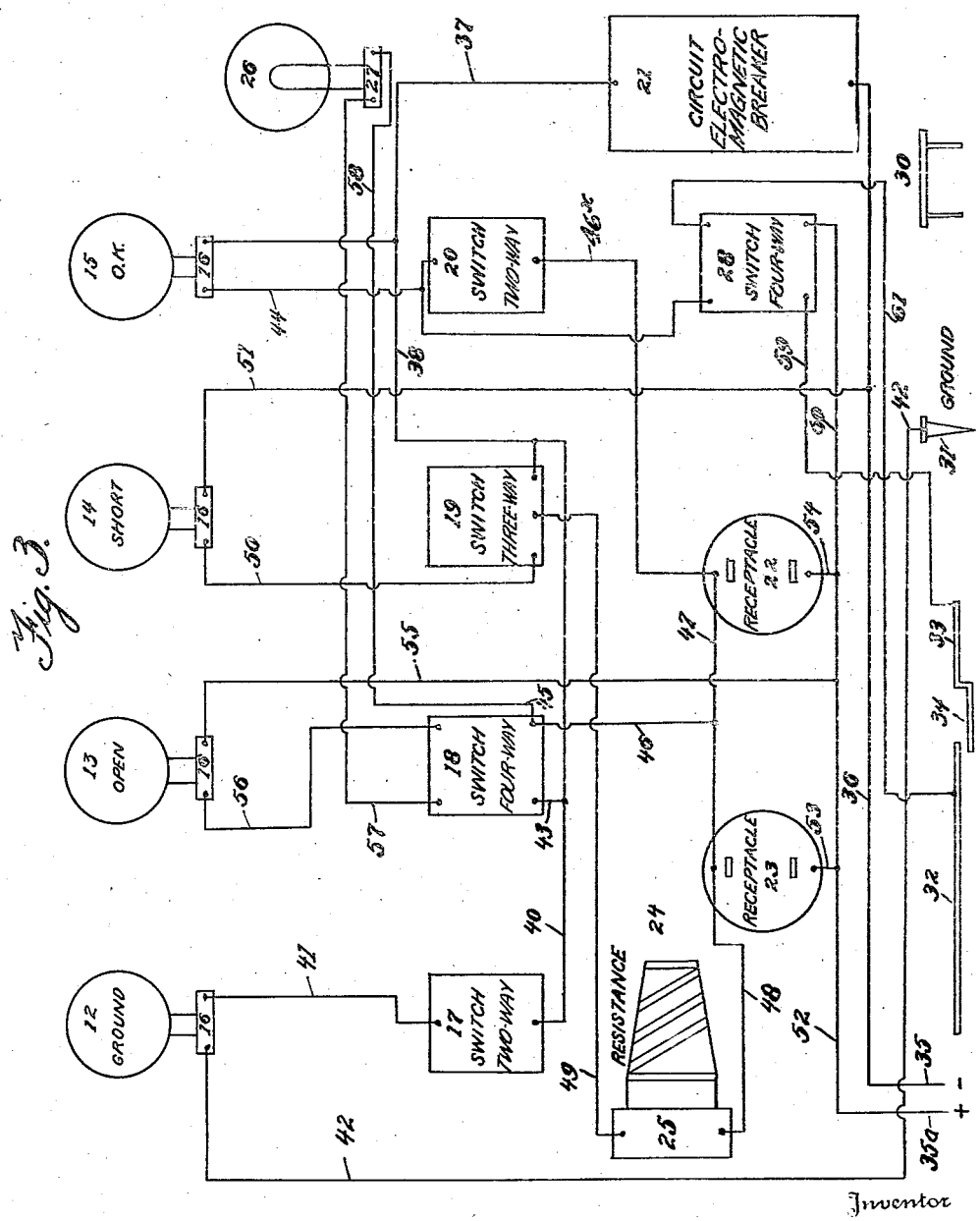

Patented Aug. 14, 1934

1,969,713

UNITED STATES PATENT OFFICE 1,969,713

ELECTRICAL TEST SET

Pearl H. Bullock, Kelso, Wash.

Application April 1, 1932, Serial No. 602,540

6 Claims. (Cl. 175—183)

This invention is directed to a test set, through the use of which electrical appliances and the conductors therefor may be tested to determine the presence or absence of a particular electrical irregularity and the selective indication of the particular irregularity, if such exists, so that anyone, irrespective of his electrical knowledge, can determine the specific nature of the difficulty in a defective electrical appliance, or in the absence of an indicated defect show, through the test set, the electrical integrity of the appliance or conductor.

The essential electrical difficulties with an appliance or conductor may be generally considered to be embraced in the three basic indications of a ground, a short circuit, or an open circuit, and when the user, realizing from the failure of the particular appliance that the appliance is defective, is generally without the skill or mechanism which will permit him to determine the character of the irregularity, then the appliance is either discarded or returned to the factory for repair.

Ordinarily, the failure of a particular appliance to operate and the thus clear indication of an electrical irregularity leaves the character of that irregularity unknown, for ordinarily even the merchants handling the appliances have no means of determining the character of the irregularity. To the skilled electrician, the question of testing an appliance for a ground, short circuit or open circuit is not difficult, but, generally speaking, the matter of selective test is beyond the ordinary individual not particularly skilled in electricity. Even with the electrician, so far as known, the test for each of the particular defects mentioned requires independent mechanism and the separate connection and mounting of the appliance for the particular test and is a more or less time and labor-consuming incident. Furthermore, so far as known, there is no testing device that operates a visible indicator on a short circuit defect in the appliance, nor a testing device in which there is a visible indicator operated under a defect of an open circuit in an appliance.

The primary object of the present invention is, therefore, the production of a test set which, through the simple connection of the appliance to be tested and the successive manipulation of a series of switches, will visibly indicate to the observer the defect of a grounded appliance, an open circuited appliance, or a short circuited appliance, with a separate indication for each, and further shall show by actual indication the correctness of the test set when failing to indicate any of these irregularities by and through an indication showing that the appliance is electrically correct.

A further object of the invention is the provision of a test set that may be as correctly and properly operated for testing purposes by one having no knowledge of electricity as by an electrical expert, for the test set as constructed requires no knowledge on the part of the user other than the ability to operate an ordinary switch, for the operation of the testing circuits requires no manipulation or knowledge on the part of the user other than the operation of the selected switch, as each of the switch-controlled circuits is particularly arranged to indicate in the appliance or conductor being tested the presence of a particular defect, thereby enabling the user, no matter how defective in electrical knowledge, to not only test the appliance or conductor for a defect but to learn as a result of the use of the test set exactly as to the nature of that defect.

A further object of the invention is the provision of the test set in a convenient, compact, cabinet form occupying comparatively little space and providing for the testing of any appliance within the limits for which the test set may be arranged.

The invention is illustrated in the accompanying drawings, wherein:—

Figure 3 is a wiring diagram.

Figure 1:
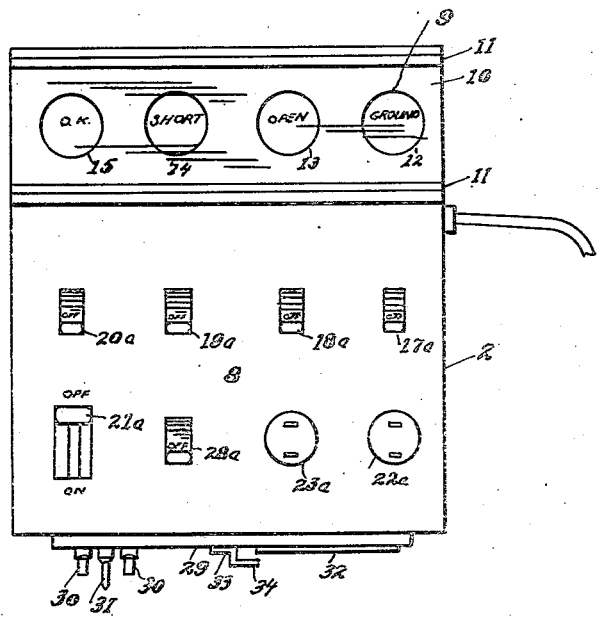
Figure 1 is a face view of the test set arranged in the preferred cabinet form.
Figure 2:
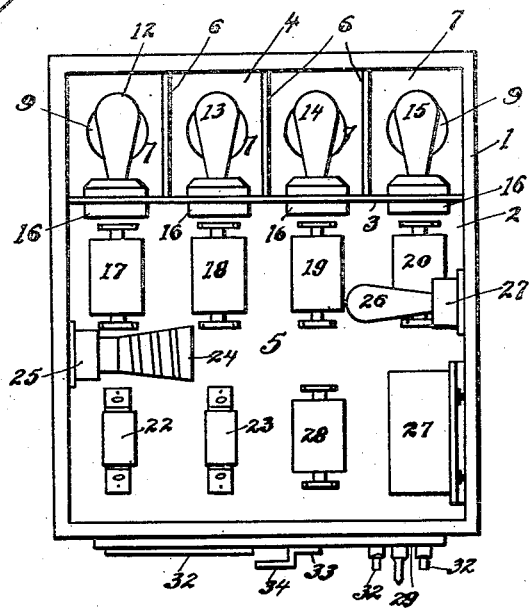
Figure 2 is a rear view of the same, the wiring being omitted.
Figure 4:
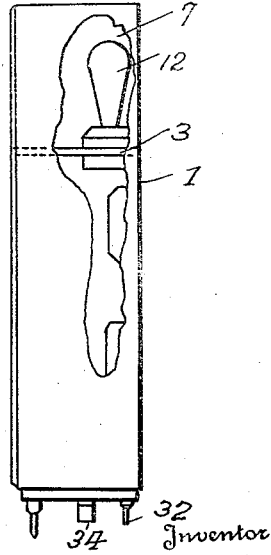
Figure 4 is a side elevation partly broken out.

The test set of the present invention involves in its preferred form a rectangular cabinet 1 having a removable bottom wall 2. The interior of the cabinet, as best seen in Figure 2, is divided by a transverse partition 3 into an upper indicator space 4 and a lower instrument space 5, the latter being much larger than the former. The indicator 4 is divided by vertical partitions 6 into a plurality of indicator chambers 7, and the top wall 8 of the cabinet is formed in line with each of the indicating chambers with an opening 9, with all of said openings covered preferably by a translucent plate 10 removably held in guides 11 on the top wall 8.

In the present instance, there are four indicator chambers, and for the purpose of the present testing set illustrated, the plate is marked in line with each opening 9 to indicate the nature of the irregularity developed, that is, the opening at the right of the cabinet being marked "Ground", the next in line being marked "Open", the next in line being marked "Short", and the next in line and final opening being marked "OK", these terms being indicative in the first three instances of a particular electrical irregularity and in the final instance of the absence of any of such irregularities. Each of the indicating chambers contains a visible indicator, those in the chambers marked through the translucent plate as "Ground", "Open" and "Short" being preferably red lamps 12, 13 and 14, while that in the chamber marked "OK" is preferably a clear lamp 15. Obviously, on the energizing of any of these lamps, the light therefrom is directed through the particular opening 9 and clearly illuminates the indicating word for the electrical difficulty of the particular test. Of course, the lamps are removably secured in sockets 16 arranged in the transverse partition 3 and are readily accessible on removal of the bottom plate for renewal or adjustment. These lamps, while serving as visible indicators, are intended to indicate any type of indicator which may be conveniently used, though, of course, a visible indicator of the lamp type is preferred owing to the certainty of the indication and the convenience by which the indicator may be renewed when necessary and the entire absence of sound which, in the use of audible indicators, might be confusing.

Secured to the bottom of the top wall of the cabinet are a plurality of switches, one for each indicator. The switch 17 for the ground indicator 12 is a single pole switch, with the manually operable element 17a thereof projecting through an opening in the top wall of the cabinet for switch control purposes. The switch controlling the indicator marked "Open" is a double pole switch 18, the manually operable element 18a of which extends through an opening in the top wall of the cabinet for manual control of the switch. The switch controlling the indicator marked "Short" is a three-point switch 19, the manually operable element 19a of which projects through an opening in the top wall of the cabinet for manual control of the switch. The switch controlling the indicator marked "OK" is a single pole switch 20, the manually operable element 20a of which extends through an opening in the top wall of the cabinet for manual control of this switch. The switches 17, 18, 19 and 20 are preferably arranged in line across the interior of the cabinet so that the manual controlling elements therefor 17a, 18a, 19a and 20a are also arranged in line across the face of the cabinet immediately below the indicator openings previously described.

Also secured within the instrument space in the cabinet is a circuit breaker 21, the manual resetting element 21a of which projects through an opening in the top wall for convenient manual operation. Circuiting connectors 22 and 23 are also arranged within the instrument space in the cabinet, the receptacle elements of the connectors, as 22a and 23a, being accessible through the front wall of the cabinet and, as illustrated, designed for the conventional two-prong plug of the ordinary appliance. A resistance element 24 is arranged within the instrument space of the cabinet, this resistance element being of any form, though preferably shown as the ordinary insulated body wound with resistance wire and carrying the usual plug terminal to removably seat in socket 25 for convenience in replacement.

There is also arranged in the instrument space of the cabinet a blind indicator or resistance in the form of a lamp 26 removably secured in a socket 27, the lamp being preferably colored green. There is an additional switch arranged in the instrument space for the use of the test set in connection with the testing of lamps and fuses. This switch, indicated at 28, has the manually operable element 28a projecting through the top wall of the cabinet for manual control of the switch.

The end wall of the cabinet opposite the end carrying the visible indicators is centrally cut out and the opening closed by a panel board 29, in which is mounted two conducting points 30 spaced to cooperate with the usual terminal socket, these plugs being electrically joined on the inner side of the panel board. Adjacent the plugs the panel board is provided with a ground pin 31, and at the end opposite the ground pin and conducting points the panel board is provided with an elongated conducting strip 32 and immediately beyond the terminal of such strip a second contact strip 33 having its end next the conducting strip outstanding at 34 to secure convenient connection of the conducting sections of an ordinary lamp plug, as will be understood.

From the above, it will be apparent that there are five testing circuits, three of which operate through independent indicators to indicate specific electrical irregularities, while the fourth and fifth of which operate through a single indicator to indicate an OK condition, each of these independent testing circuits being controlled by its own switch, and following an understanding of the circuits as hereinafter indicated, it will be apparent that the circuit breaker 21 is common to all circuits and that the circuiting connectors 22 and 23 are common to all testing circuits other than that controlled by the switch 28 which controls the lamp and fuse testing circuit.

In the wiring diagram shown more particularly in Figure 3, it will, of course, be appreciated that the wires of the various circuits are simplified in connection and arrangement in order to reduce the number of wires and avoid complications. The specific wiring diagram of the set will be first described and then each testing circuit defined in connection with the particular test described.

The wiring diagram is depicted as viewed from the rear of the machine, in which the ground indicator 12 will appear to the left instead of to the right, as when the cabinet is viewed from the front. The various circuits of the test set are energized through main conductors 35 and 35a representing in this instance the conventional cord extension having a terminal plug by which the set may be connected into any appropriate outlet. The conductor 36 is led to the circuit breaker 21, the other side of the circuit breaker being connected through a conductor 37 with one terminal of the socket 16 of the "OK" visible indicator 15. This same socket terminal is connected by a conductor 38 with one point of three-point switch 19, this same point of switch 19 being connected by conductor 40 to one of the points of a two-way switch 17, the other point of which switch is connected by conductor 41 to the socket 16 of the ground lamp indicator 12, the other point of the socket 16 of indicator 12 being connected by conductor 42 with the ground pin 31 of the set. The conductor 40 is also connected by a conductor 43 with one of the points of the four-point switch 18.

Thus the circuit breaker is connected directly to and through each of the switches 17, 18 and 19 and directly to the "OK" indicator 15. The other terminal point of the socket 16 of the "OK" indicator 15 is connected by conductor 44 with one point of the two-point switch 20, through said switch to one side of the receptacle 22 by conductor 46$^x$, the point of the receptacle 22 being connected by conductor 47 to the similar side of receptacle 23 and the same side of the receptacle 23 being connected by conductor 48 to the resistance socket 25, the opposite side of the resistance socket being connected by conductor 49 to one of the points of the three-point switch 19. The remaining point of the three-point switch 19 is connected by conductor 50 to one terminal point of the socket 16 of the "short" indicator 14, the opposite side of this socket being connected by conductor 51 to the main lead 36.

The other main conductor 35a is extended as a conductor 52 and connected to the similar sides of the receptacles 22 and 23 as by conductors 53 and 54, the main extension 52 being beyond receptacle 22 connected by conductor 55 with one terminal of the socket 16 of the "open" indicator 13. The opposite side of the socket 16 of the indicator 13 is connected by conductor 56 to one of the points of the four-point switch 18. The remaining point of the four-point switch 18 is connected by conductor 57 to the socket 27 of the blind indicator 26, a conductor 58 leading to the other side of this socket to the conductor 45. The contact strip 33 is connected by conductor 59 through switch 29 and conductor 59x to that terminal of socket 16 of the "OK" indicator 15 to which the conductor 44 is connected.

The conductor 55 which leads from one terminal of the socket 16 for the "open" indicator 13 is between the receptacle 22 and the indicator socket 16 branched and connected by conductor 60 to one side of the four-point switch 28, the other side of which is connected by conductor 61 to the conducting strip 32. The circuiting arrangement of the three-point switch 19 is such that when the switch is closed, all three points are bridged, while in the circuiting arrangement of the four-point switch 18, the switch when closed serves to bridge on the one hand the conductors 43 and 57 and on the other hand 45 and 56. The receptacles are in parallel with the circuits, and obviously either or both may be used for testing purposes.

The respective test circuits will now be defined in connection with the testing of an appliance, say an electric iron, these tests being preferably carried out in the order in which the testing indicators are arranged, that is, first "ground" test; second "open" test; third "short" test; and fourth "OK" test. In the first or "ground" test, the cord terminal of the appliance is connected in the usual way in one of the receptacles 22 or 23 and the shell or exterior of the appliance is placed in electrical contact with the ground pin 31. The switch 17 is then closed. If a ground exists in the appliance, the current will follow the following path for "ground" indication—the main conductor 35, the conductor 36, circuit breaker 21, conductors 37, 38 and 40, switch 17, conductor 41, ground indicator 12, conductor 42 to ground pin 31, shell of the appliance, conducting cord of the appliance, receptacle 22 or 23, conductor 52 and main 35a. If the appliance is grounded, an uninterrupted circuit will thus be presented and the ground indicator 12 will be energized and the existence of a ground shown. If the appliance is not grounded, there will be no circuiting condition between the ground pin 18 and the conductor from the appliance, that is, between ground pin 18 and the particular selected receptacle of the set and, therefore, the ground indicator 12 will not be energized and this particular test will show the absence of a ground in the appliance.

In testing for an open circuit in the appliance, with the appliance connected to one of the receptacles as stated, the four-point switch 18 is closed and the circuiting conditions are as follows: main 35, conductor 36, circuit breaker 21, conductors 37, 38 and 40 and 43, one side of switch 18, conductor 57, blind indicator 26, conductor 58, conductor 45, the other side of switch 18, conductor 56, lamp 13, conductor 55, and conductor 52. If the appliance circuit is open, the blind indicator 26 and the "open" indicator 13 are thus energized in series, indicating the absence of a circuit passing through the appliance and hence an open circuiting condition in the latter. If the appliance circuit is not open, the testing circuit current passes from main 35, over conductor 36, through the circuit breaker 21, conductors 37, 38, 40 and 43, switch 18, conductor 57, blind indicator 26, conductor 58, conductor 46, receptacle 22 or 23 as selected, through the circuit of the appliance and conductor from receptacle to conductor 52 to the other main 35a. As the blind indicator is, of course, energized but being enclosed within the cabinet is not visible, and while it is possible that the "open" indicator 13 will be slightly energized, this will not appreciably change its visible appearance through the translucent plate. Ordinarily assuming the lamps of the indicators 26 and 13 to be ten-watt lamps, a twenty-watt appliance will permit an extremely dim indication of the "open" indicator 13, whereas if the wattage of the appliance is higher, say one hundred watts, the "open" indicator 13 will not be energized at all.

In testing for a short circuit, the appliance is connected in one of the receptacles and the circuiting conditions involve main 35, conductor 36, circuit breaker 21, conductors 37 and 38, switch 19, which of course is closed, conductor 49, one terminal of resistance socket 25, resistance 24, selected receptacle, through short circuited appliance to conductor 52 to the other main conductor 35a. For the purpose of this test, it will be assumed that resistance 24 draws approximately six amperes, while the circuit breaker 21 is set at about 2.4 amperes. This will cause the breaker to open in approximately five seconds, and with the breaker open, the current through conductor 36 passes through conductor 51, "short" indicator 14, conductor 50, switch 19, conductor 49, resistance 24, conductor 48, selected receptacle, through appliance conductor 52 and main 35a. This energizes the "short" indicator 14 to indicate this condition.

If the appliance being tested is not short circuited, the current passes through the appliance and as the appliance is thus in series with the resistance 24, the amperage will vary in the circuit according to the wattage of the appliance being tested, but in any event will be much less than the resistance alone and the circuit breaker will hold for a much longer period, approximately in the particular instance for ten seconds, during which, of course, the "short" indicator 14 will not be energized. Therefore, in this test there is a material period of time, depending primarily upon the character of the appliance, within which the "short" indicator 14 will be energized if the appliance is shorted and during which it will not be energized if no short exists. Thus a satisfactory test clearly within the skill of anyone without a knowledge of electricity as to the shorted or non-shorted condition of the appliance is readily perfected.

In providing for the "OK" test, assuming the appliance connected in the receptacle and the switch 20 closed, current passes over conductors 35, 36, circuit breaker 21, conductor 37, socket 16 of the "OK" indicator 15, conductor 44, switch 20, conductor 45, selected receptacle 22 or 23, conductor 52 to the other line conductor 35a. If the appliance is electrically intact as to circuiting conditions, the "OK" indicator 15 will be energized.

In testing lamps or fuses, they are bridged between strips 32 and the projection 34 of strip 33, the current then passes over main 35, conductor 36, circuit breaker 21, conductor 37, socket 16 of "OK" indicator 15, switch 28, conductor 59 to strip 33, the article being tested, strip 32, conductor 61, switch 28, which of course has been closed, conductor 60, conductor 52 to the other line 35a. If the article being tested is electrically integral, the "OK" indicator 15 will be energized.

The test set further lends itself to the ready testing of continuity of cords or electrical conductors. The cord to be tested is first connected in one of the receptacles, the switch 19 is closed, the circuiting conditions are as described in connection with the appliance, and if there is a short circuit in the cord, it will be indicated on the "short" indicator 14. If the test shows that the cord is not short circuited, the appliance end of the cord may be then bridged by connecting it to the terminals 30 on the panel board 29 and switch 18 is closed. If the cord is open, the "open" indicator 13 will be energized to indicate that fact, the circuits being the same as described in connection with the testing of an appliance. On closing switch 20, the cord may be tested to indicate that it is electrically integral by causing the energization of the "OK" indicator 15. The test set then provides for a ready discovery of the main causes of trouble in the electrical field, which are grounds, opens and short circuits, and obviously the device lends itself readily to the testing of any current-consuming device in which these defects are possible.

An essential characteristic of the set is the energization of a visible signal of the presence of a short circuit in the appliance being tested and also the energization of a visible signal in the event of an open circuit in the appliance being tested. With the test set, no electrical knowledge or skill is necessary. The current-consuming device to be tested is simply arranged in the obvious manner and the various switches closed one after the other for the purpose of the test. There is no limitation intended in the particular use to visible signals, though such are preferred, and it is, of course, quite apparent that by varying the resistance units, a particular set can be adapted for the testing of any and all size appliances. This applies with equal force to the voltage or amperage of the circuit breaker, and where these have been indicated particularly in the above description, they are intended merely to carry out the particular example and all such elements are contemplated as being variable within the purview of the invention to accommodate the set for the testing of particular types, varieties and sizes of appliances or current-consuming devices where the resistance or power of such devices requires variation in the resistance units and circuit breaker of the particular set.

I claim:—

1. A test set including a signal, a circuit in which the signal is connected, a receptacle to which the appliance being tested is connected and a switch for closing the circuit, and circuiting arrangements providing for an indication of the signal in the event of an open circuiting condition in the appliance and the failure of such signal in the absence of such open circuiting condition in the appliance.

2. A test set including a signal, a receptacle in which the appliance to be tested is connected, a circuit, a switch for controlling the circuit, a circuit breaker in the circuit, a circuiting bypass including the signal and in circuiting relations following opening of the circuit breaker, and means in the circuit for determining the time interval at which the circuit breaker will open, the circuit breaker opening the circuit following a predetermined time interval in the event of a short in the appliance circuit to thereby energize the signal, the circuit of the appliance being in series with the resistance to hold the breaker against opening for a period in excess of that predetermined by a short condition in the appliance to thereby avoid signal indication.

3. A test set including a short circuit indicating signal, an open circuit indicating signal, circuits including the signals, a receptacle to receive the appliance being tested, said receptacle being common to both circuits, a switch for controlling each circuit, the circuiting conditions of each circuit providing for the energizing of a signal in the event of a short circuit or in the event of an open circuit.

4. A test set including a casing having a face plate provided with a receptacle and a plurality of switch buttons, the interior of the casing being provided with a plurality of signals visible through openings in the face plate, switches within the casing controlled by the respective buttons, a circuit breaker within the casing and a resistance within the casing, and circuits common to the receptacle and to the circuit breaker, with each circuit governed through a selective switch and each of said circuits controlling a signal.

5. A test set including a casing having a face plate provided with a receptacle and a plurality of switch buttons, the interior of the casing being provided with a plurality of signals visible through openings in the face plate, switches within the casing controlled by the respective buttons, a circuit breaker within the casing and a resistance within the casing, circuits common to the receptacle and to the circuit breaker, with each circuit governed through a selective switch and each of said circuits controlling a signal, and a resistance within the casing included in one of the circuits.

6. A test set including a casing having a face plate provided with a receptacle and a plurality of switch buttons, the interior of the casing being provided with a plurality of signals visible through openings in the face plate, switches within the casing controlled by the respective buttons, a circuit breaker within the casing and a resistance within the casing, circuits common to the receptacle and to the circuit breaker, with each circuit governed through a selective switch and each of said circuits controlling a signal, a resistance within the casing included in one of the circuits, and a blind indicator within the casing and included in another of said circuits.

PEARL H. BULLOCK. [L. s.]